US009467806B2

(12) United States Patent
Omar

(10) Patent No.: US 9,467,806 B2
(45) Date of Patent: Oct. 11, 2016

(54) IMPROVEMENTS RELATED TO TRACKING MOVING OBJECTS

(71) Applicant: Omarco Network Solutions Limited, Douglas, Isle of Man British Isles (GB)

(72) Inventor: Ralph Mahmoud Omar, Isle of Man British Isles (GB)

(73) Assignee: Omarco Network Solutions Limited, Douglas (IM)

( * ) Notice: Subject to any disclaimer, the term of this patent is extended or adjusted under 35 U.S.C. 154(b) by 0 days.

(21) Appl. No.: 14/650,837

(22) PCT Filed: Dec. 16, 2013

(86) PCT No.: PCT/GB2013/053313
§ 371 (c)(1),
(2) Date: Jun. 9, 2015

(87) PCT Pub. No.: WO2014/091256
PCT Pub. Date: Jun. 19, 2014

(65) Prior Publication Data
US 2015/0382139 A1    Dec. 31, 2015

(30) Foreign Application Priority Data

Dec. 14, 2012 (GB) .................................. 1222625.4

(51) Int. Cl.
*H04W 4/02* (2009.01)
*G01S 5/02* (2010.01)
*G06Q 30/02* (2012.01)
*G08G 1/01* (2006.01)

(52) U.S. Cl.
CPC .............. *H04W 4/02* (2013.01); *G01S 5/0294* (2013.01); *G06Q 30/0261* (2013.01); *G06Q 30/0266* (2013.01); *G08G 1/012* (2013.01); *G08G 1/0129* (2013.01)

(58) Field of Classification Search
CPC .................................. H04W 4/02; G01S 5/02
USPC .......................................... 455/456.1–456.6
See application file for complete search history.

(56) References Cited

U.S. PATENT DOCUMENTS 8,442,502 B2 * 5/2013 Leung .................. G01S 13/003
455/404.2
8,538,458 B2 * 9/2013 Haney .................. H04W 12/08
455/456.1

(Continued)

OTHER PUBLICATIONS

International Search Report for International Application No. PCT/GB2013/053313, entitled "Improvements Related to Tracking Moving Objects," dated Mar. 12, 2014, consisting of 2 pages.

*Primary Examiner* — Michael T Vu
(74) *Attorney, Agent, or Firm* — Hamilton, Brook, Smith & Reynolds, P.C.

(57) ABSTRACT

A control system for tracking moving objects and controlling an action at a selected one of a plurality of geographic locations is described. The system comprises: a receiver for receiving location data from a plurality of mobile devices; a tracking module for recording the location data from each of the plurality of location devices in a tracking database; a cluster formation module for grouping a plurality moving mobile devices into a cluster using the recorded location data over time, each cluster comprising a plurality of moving mobile devices which have substantially no relative movement with respect to each other; a route extrapolator for determining a geographic location at which the cluster of mobile devices will be at a future point in time using the tracked history of the cluster and a predetermined network of pathways along which the cluster can travel; and an action module for sending out an instruction regarding an action to be carried out at the selected geographic location where the cluster is predicted to arrive at the future point in time.

24 Claims, 18 Drawing Sheets

(56) References Cited

U.S. PATENT DOCUMENTS 9,020,536 B1* 4/2015 Crossno ............ G06Q 10/0833
455/456.1

| | | |
|---|---|---|
| 2002/0016173 A1 | 2/2002 | Hunzinger |
| 2002/0107634 A1 | 8/2002 | Luciani |
| 2011/0035282 A1 | 2/2011 | Spatscheck |

* cited by examiner

IMPROVEMENTS RELATED TO TRACKING MOVING OBJECTS

RELATED APPLICATION

This application is the U.S. National Stage of International Application No. PCT/GB2013/053313, filed Dec. 16, 2013, which designates the U.S., published in English, and claims priority under 35 U.S.C. §§119 or 365(c) to Great Britain Application No. 1222625.4, filed Dec. 14, 2012. The entire teachings of the above applications are incorporated herein by reference.

TECHNICAL FIELD

The present invention concerns improvements relating to tracking moving objects and more particularly, though not exclusively, relates to the use of Global Positioning System (GPS) or mobile phone tracking ability to provide group behavioural information, particularly for traffic reporting. The present invention also extends to use of the determined group behaviour to facilitate an appropriate predictive action for future interaction with the group.

BACKGROUND

Many mobile devices comprise GPS receivers that receive signals from GPS satellites to ascertain the mobile device's location on Earth. Alternatively, mobile devices may be capable of receiving signals from other satellite-based systems such as GLONASS, Galileo and/or BeiDou, to determine the device's location.

Tracking the location of mobile devices such as mobile phones can also be can carried out using network-based methods. Mobile phones are operatively connected to communication networks through network radio towers. As is known in the art, the strength of the communication signals between radio towers and the mobile phone can be used to estimate the distance from the radio towers. As the radio towers are at fixed and known locations, the location of the mobile phone can be determined using a technique such as triangulation or multilateration.

Mobile devices comprising Wi-Fi modules can also be tracked using Wi-Fi, particularly indoors when GPS and network radio signals may be too weak to for the purposes of determining the location of the mobile device.

The location data of the mobile devices, including geographic coordinates and time at which the mobile device was at those geographic coordinates, may then be sent to a central system. Once a plurality of location data are received from each mobile device, analysis software operating on the central system can be used to determine the speed and direction of movement of the mobile device over time.

The speed of traffic flow on a road can be determined from the speed of movement of a plurality of mobile devices that are travelling along the road. The route taken and speed behaviour (e.g. typical speed achieved and stoppages) that a mobile device undergoes can be used to determine whether the mobile device is associated with a vehicle or a pedestrian.

Further analysis can be carried out on the mobile devices that are associated with vehicles, for example, to determine traffic flow information.

However, a problem in existing systems is that the traffic flow information that is generated is based on historic locations of the mobile devices and is inherently out of date. As traffic can build up or dissipate in the order of minutes, timely traffic reporting cannot be achieved with existing systems.

Further, the location data received from the mobile devices cannot be used to predict future traffic flow information as it is inherently out-of-date information. A solution to this problem is to estimate traffic conditions based on aggregating historic traffic flow as the same time of day in previous weeks.

Separately, displays for providing content (such as notice boards for information and billboards for advertisements) typically comprise static content, or at best displays that scroll through or present a series of repeating advertisements. As the displays may be viewed by a large volume of people, a limitation of such displays is that the content may only be directed to a particular demographic within the large volume of people. This means that the content display is not efficiently utilised as the content being provided may not be relevant to many viewers.

Accordingly, it is desired to address at least some of the above described problems.

SUMMARY OF THE INVENTION

According to one aspect of the present invention there is provided A control system for tracking moving objects and controlling an action at a selected one of a plurality of geographic locations, the system comprising: a receiver for receiving location data from a plurality of mobile devices; a tracking module for recording the location data from each of the plurality of location devices in a tracking database; a cluster formation module for grouping a plurality moving mobile devices into a cluster using the recorded location data over time, each cluster comprising a plurality of moving mobile devices which have substantially no relative movement with respect to each other; a route extrapolator for determining a geographic location at which the cluster of mobile devices will be at a future point in time using the tracked history of the cluster and a predetermined network of pathways along which the cluster can travel; and an action module for sending out an instruction regarding an action to be carried out at the selected geographic location where the cluster is predicted to arrive at the future point in time.

The cluster formation module can be arranged to apply predetermined thresholds to minimal allowable relative movement between different mobile devices within the definition a cluster. This advantageously enables some slight relative movement between the data sources within a cluster and for example accommodates movement for example within a train carriage or in a bus.

The route extrapolator can be arranged to determine two or more geographic locations at which the cluster may be at a future point in time, the two or more geographic locations comprising a subset of the plurality of geographic locations. In this way, an area in which the cluster is likely to be in the future can be determined and the action can be carried out simultaneously at all of the selected geographic locations to provide greater certainty that the action will result in interaction with the cluster at one of the locations.

The system may further comprise a cluster categorisation module for categorising a cluster according to a most-common feature of each of the constituents of the cluster. Also the action module may be arranged to select the action based on a most common feature of the cluster. In this way information which is best suited to the majority of the cluster can be determined and provided to the cluster at the geographic location for user interaction.

The cluster categorisation module can be arranged to retrieve stored user profiles of each of the constituents of a cluster from a user profile database, each profile providing information regarding a user in a plurality of categories.

The system may further comprise a cluster database for storing the details of each cluster including the most common feature determined by the cluster categorisation module.

The system may further comprise a points-of-interaction database having a plurality of records, each record including a geographic location of a corresponding information interaction point at which audio-visual information can be provided to the cluster.

Each record may comprise a communications address of a remotely controllable interactive advertising display, to which the instruction can be sent.

The system may further comprise a selector for selecting a point of interaction from the points-of-interaction database, the selected point of interaction being located at the determined geographic location.

The system may further comprise a content database for storing content to be sent to the point of interaction and a content selector for selection the content based on the most common feature of the cluster. Furthermore, the system may further comprise a pathway database storing a predetermined network of pathways along which the cluster can travel.

The pathway database may include timetabled transport network information, road network information and pedestrian walkway information.

The system may further comprise a pathway sorter, for determining a predetermined pathway of the pathways database which a current mobile device is traversing, the pathway sorter being arranged to read the tracking database.

The system may further comprise a time and location analyser remove erroneous or spurious data from each mobile device's location data. The time and location analyser can be arranged to apply statistical analysis to remove the erroneous data over a period of time.

The system may further comprise a route determiner configured to determine the route that the mobile device has undertaken along a pathway and the speed of movement along the route.

According to another aspect, there is provided a method of tracking moving objects and controlling an action at a selected one of a plurality of geographic locations, the method comprising: receiving location data from a plurality of mobile devices; recording the location data from each of the plurality of location devices; grouping a plurality moving mobile devices into a cluster using the recorded location data over time, each cluster comprising a plurality of moving mobile devices which have substantially no relative movement with respect to each other; determining a geographic location at which the cluster of mobile devices will be at a future point in time using the tracked history of the cluster and a predetermined network of pathways along which the cluster can travel; and sending out an instruction regarding an action to be carried out at the selected geographic location where the cluster is predicted to arrive at the future point in time.

According to another aspect, there is provided a control system for tracking moving objects and controlling an action at a selected one of a plurality of geographic locations; the system comprising: a receiver for receiving location data from a plurality of mobile devices; a tracking module for recording the location data from each of the plurality of location devices in a tracking database; a cluster formation module for grouping a plurality moving mobile devices into a cluster using the recorded location data over time, each cluster comprising a plurality of moving mobile devices which have substantially no relative movement with respect to each other; a route extrapolator for determining a geographic location at which the cluster of mobile devices will be at a future point in time using the tracked history of the cluster and a predetermined network of pathways along which the cluster can travel; and an action module for sending out information regarding where the cluster is predicted to arrive at the future point in time.

The system may further comprise an analysis module for determining the size and speed of each cluster. The analysis module can be arranged to compare the output of the cluster formation module with a plurality of predetermined profiles to determine a mode of transport which the cluster is associated with.

The analysis module can also be arranged to use the determined mode of transport in calculating traffic build up on parts of the network of pathways.

The action module can be arranged to send the information out to the mobile device to which the information relates.

According to another aspect of the present invention there is provided a method of tracking moving objects and controlling an action at a selected one of a plurality of geographic locations; the method comprising: receiving location data from a plurality of mobile devices; recording the location data from each of the plurality of location devices; grouping a plurality moving mobile devices into a cluster using the recorded location data over time, each cluster comprising a plurality of moving mobile devices which have substantially no relative movement with respect to each other; determining a geographic location at which the cluster of mobile devices will be at a future point in time using the tracked history of the cluster and a predetermined network of pathways along which the cluster can travel; and sending out information regarding where the cluster is predicted to arrive at the future point in time.

BRIEF DESCRIPTION OF THE DRAWINGS

In order that the invention may be more readily understood, embodiments of the invention will now be described in more detail, by way of example only, and with reference to the following figures in which.

DETAILED DESCRIPTION OF THE PREFERRED EMBODIMENTS

Figure 1:
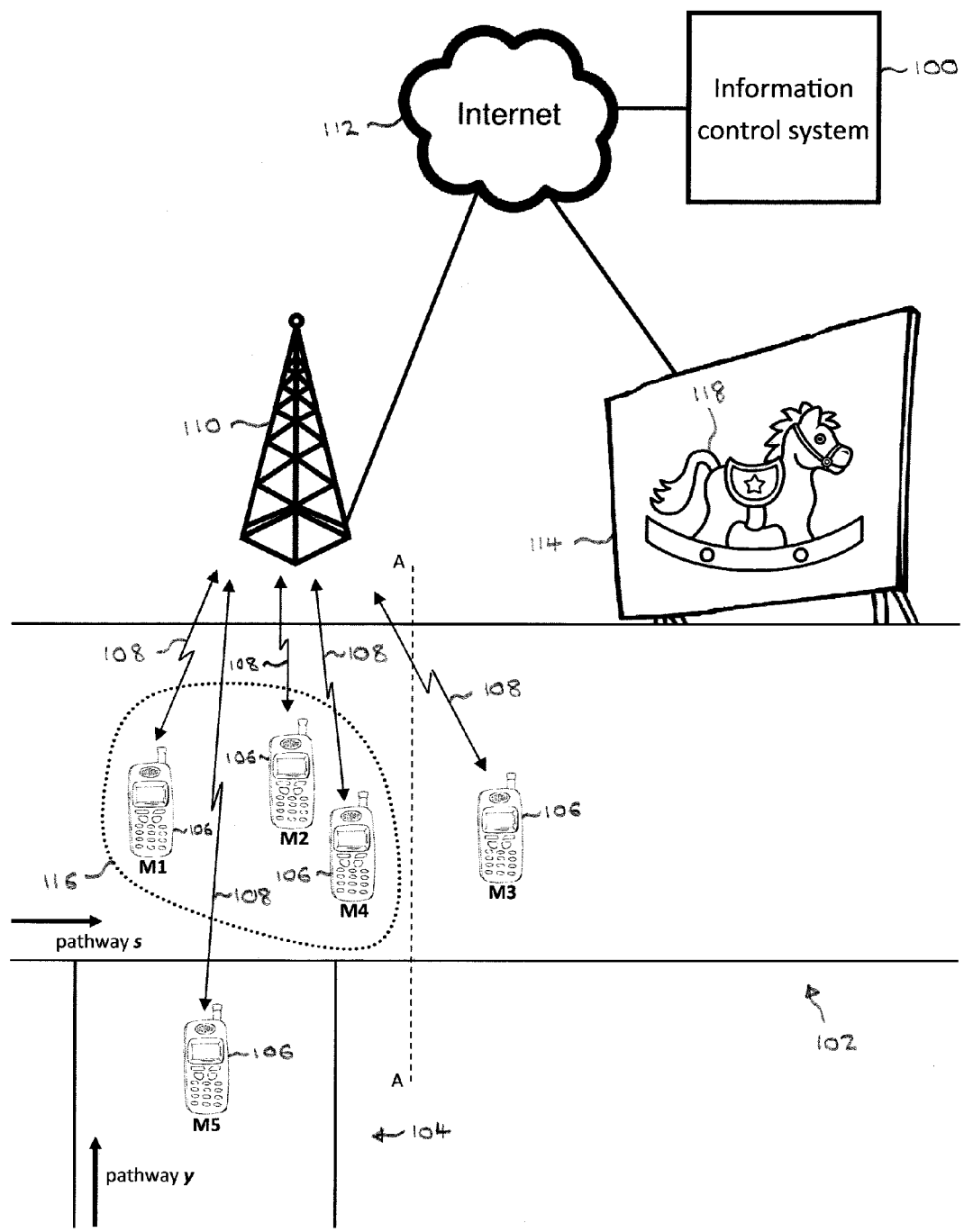
FIG. 1 is a schematic view of an information control system according to an embodiment of the invention and an environment in which the information control system operates.

Referring to FIG. 1, an information control system 100 according to an embodiment of the present invention is shown together with an environment in which the information control system 100 operates.

FIG. 1 shows two pathways, pathway s 102 and pathway y 104, on which a plurality of mobile devices 106, M1 to M5, are travelling. In this embodiment, the mobile devices 106 are mobile phones each associated with, and being carried by, individual users. The mobile devices 106 are configured to communicate data wirelessly 108 to and from a cellular communications network 110 (represented by a cell site in the figure) as is known in the art. The cellular communications network 110 is operatively connected to the Internet 112. Whilst the Internet 112 is used in this example, other data communications networks may be used, for example, a local area network or a wide area network.

Positioned along the pathway s 102, there is a point of interaction (POI) 114 that is also operatively connected to the Internet 112. Further, the information control system 100 is operatively connected to the Internet 112 so as to be in communication with the plurality of mobile devices 106 and the POI 114.

Each mobile device 106 is configured to determine its location data, for example by satellite navigation, Wi-Fi tracking and/or mobile phone tracking as described above. The location data comprises geographic position (e.g. latitude and longitude, grid reference, altitude) and the time at which the mobile device is at this geographic position. The location data is communicated to the information control system 100 via the communications network 110 and the Internet 112. As will be described in further detail below, the information control system 100 tracks the plurality of mobile devices 106 and defines a subset of mobile devices into a 'cluster', a group of mobile devices that are behaving in the same way with respect to mode of travel.

In FIG. 1, the cluster 116 comprises mobile devices 106 M1, M2 and M4. The information control system 100 is configured to determine an action to be carried out at the point of interaction 114 based on the common factors of the constituents of the cluster 116.

In this embodiment, the point of interaction 114 is an LED billboard displaying an advertisement for a rocking horse 118. The action of displaying this particular advertisement has been determined by the information control system 100 as it is targeted to the demographic that the majority of the users associated with the mobile devices in the cluster 116 belong to. As the cluster 116 of mobile devices approaches the point of interaction 114, the users are able to view the content being displayed (i.e. the rocking horse 118). The content or advertisement displayed on the point of interaction 114 may change once the cluster 116 is no longer able to view it, for example once they have travelled beyond the POI 114.

The dashed line A-A in FIG. 1 is along pathway s 102, ahead of the POI 114. A-A represents the location by which the information control system 100 initiates the action of displaying the content targeted to the cluster 116, to allow the cluster 116 enough time to view the advertisement.

Figure 2:
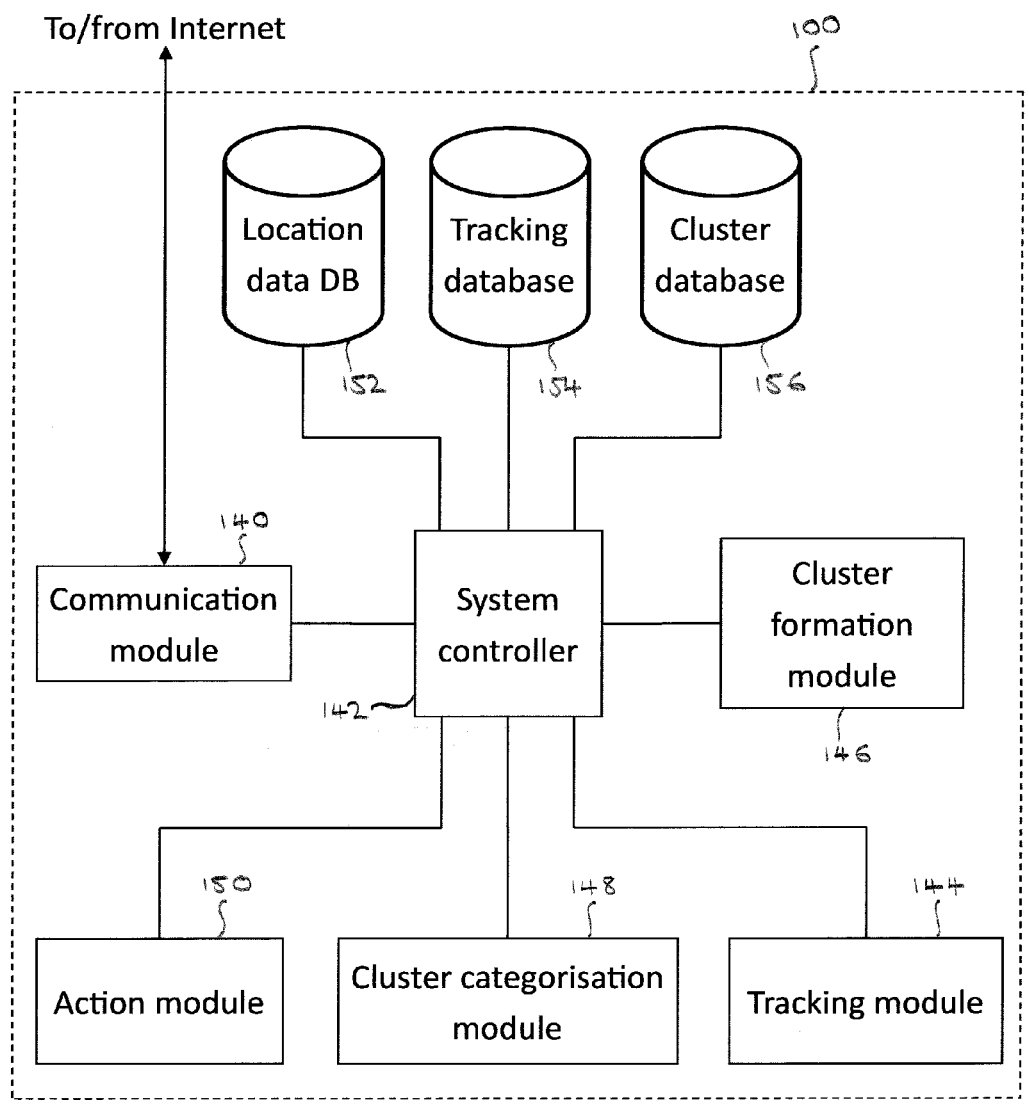
FIG. 2 is a schematic block diagram of the information control system of FIG. 1.

FIG. 2 shows the information control system 100 in greater detail. The information control system 100 comprises a communication module 140, a system controller 142, a tracking module 144, a cluster formation module 146, a cluster categorisation module 148 and an action module 150. The information control system 100 further comprises a location data database 152, a tracking database 154 and a cluster database 156. Each of the modules and databases comprises its own connection to the system controller 142, and the system controller 142 handles the data flow around the information control system 100.

The communications module 140 is configured to transmit and receive data to and from the Internet 112 using network protocols known in the art, such as TCP/IP. Incoming location data are stored in the location data database 152.

The location data is analysed by the tracking module 144. The tracking module 144 is configured to determine the route that each mobile device 106 has undertaken from the location data. In this regard, the tracking module 144 also includes geographic mapping data which enables the tracking module 144 to determine the location of predetermined pathways such as road and rail networks, footpaths and cycle paths. The determined route information of each mobile 106 device is stored in the tracking database 154.

The cluster formation module 146 obtains and compares route information of the mobile devices 106 from the tracking database 154 to determine mobile devices 106 that are undertaking similar routes. It then groups the mobile devices that are undertaking similar routes into clusters 116, and stores the details of cluster compositions in the cluster database 156.

For each cluster 116 in the cluster database 156, the cluster categorisation module 148 inspects the constituents to determine any commonalities between the users associated with the mobile devices 106 in each cluster. For example, if the majority of the users are predominantly in the same socio-economic group, the cluster categorisation module 148 identifies this. Information regarding any commonalities between the users of the mobile devices in each cluster 116 is stored in the cluster database 156.

The action module 150 selects one or more POIs 114 where each cluster 116 is likely to arrive at in the future. The action module 150 also determines the most appropriate action to carry out at the one or more selected points of interaction 114. In order to make the determination, the action module 150 takes into account factors including the location of the clusters, the location of the points of interaction, the calculated direction of travel, the available predetermined pathways and the commonalities between the cluster constituents. The actions are communicated to the one or more selected points of interaction 114 via the Internet 112.

Figure 3:
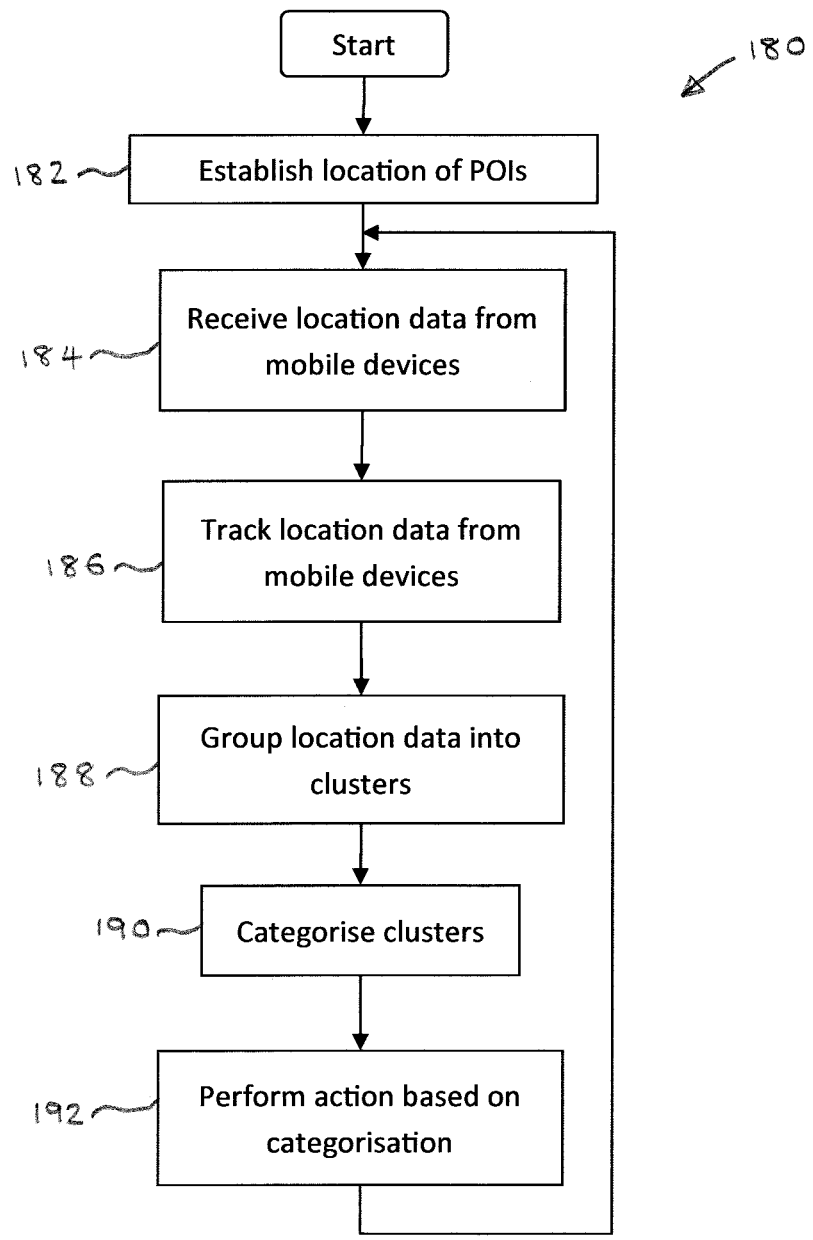
FIG. 3 is a flowchart illustrating a process carried out by the information control system of FIG. 1.

FIG. 3 shows a process 180 carried out by the information control system 100. Once the process has started, the action module 150 establishes at Step 182 the location of the points of interaction. The location data of the plurality of mobile devices 106 is received at Step 184 by the communication module 140 via the Internet 112 and stored in the location data database 152.

The tracking module 144 then obtains at Step 186 the location data for all the mobile devices 106 for a given time period from the location data database 152 to determine the route that each mobile device 106 has undertaken in the time period and to extrapolate the location where each mobile device 106 may be at a future time.

The cluster formation module 146 groups, at Step 188, mobile devices that are undertaking similar routes into clusters 116. Each cluster 116 of mobile devices 106 is analysed at Step 190 by the cluster categorisation module 148. The cluster categorisation module 148 determines, also at Step 190, any commonalities between the users associated with the mobile devices 106 in each cluster 116 and thus categorises each cluster 116. For example, if the majority of the users are predominantly in the same socio-economic group, the cluster categorisation module places them in the same relevant category.

The action module 150 then determines at Step 192 appropriate actions to carry out on each point of interaction 114, taking into account proximity of clusters 116 to points of interaction 114 and the clusters' categorisations.

Once the action has been carried out, the process loops back to receiving (at Step 184) location data points from mobile devices 106.

Figure 4:
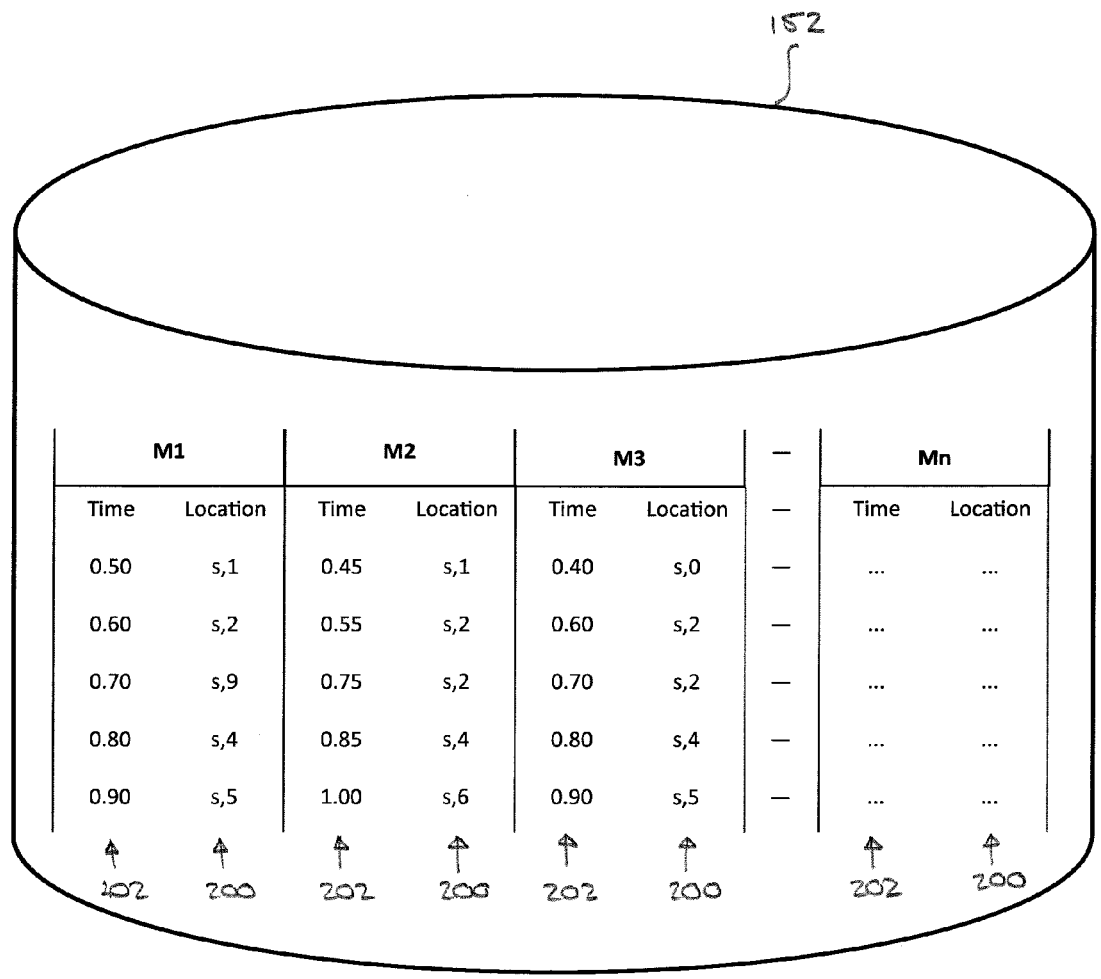
FIG. 4 is a schematic diagram of the location data database of FIG. 2.

FIG. 4 shows the location data database 152 in greater detail. For each mobile device 106, a location 200 and time 202 at which it is at that the location 200 is stored. The times 202 at which the location is obtained may not be at regular intervals and each mobile device may not provide its location at the same time as other mobile devices. For example, the times that locations are available for M1 are not the same as M2 or M3.

Figure 5:
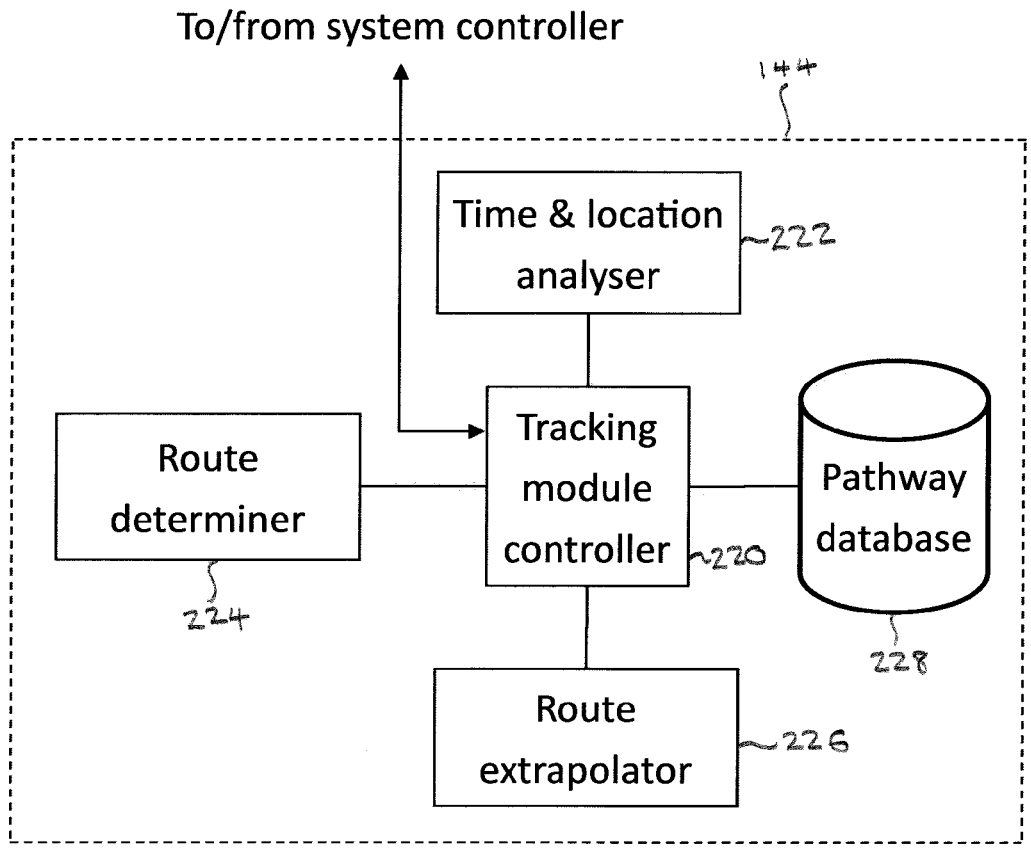
FIG. 5 is a schematic block diagram of the tracking module of FIG. 2.

FIG. 5 shows the tracking module comprising a tracking module controller 220, a time and location analyser 222, a route determiner 224, a route extrapolator 226 and a pathway database 228. The tracking module controller 220 is operatively connected to the system controller 142. The time and location analyser 222, the route determiner 224, the route extrapolator 226 and the pathway database 228 are each connected to the tracking module controller 220.

The pathway database 228 comprises map data, including the arrangement of pathway s 102 and pathway y 104. Further non-limiting examples of map data in the pathway database 228 include roads, train lines, ferry routes, shopping centre floor plans, tunnels and bus routes.

The time and location analyser 222 is configured to remove erroneous or spurious data from each mobile device's location data to 'clean' the location data. The clean location data is communicated to the route determiner 224. The route determiner 224 is arranged to compare the clean location data to known pathways from the pathway database 228 and determine the pathway(s) that the mobile device has moved on, the route that the mobile device has undertaken along these pathways, and the speed at which it has moved. The output of the route determiner 224 is stored in the tracking database 154.

The route extrapolator 226 is configured to estimate the likely trajectory of each mobile device 106 over a predetermined length of time into the future, taking into account factors including the route already undertaken, the speed of motion of the mobile device 106 and the known pathways in the pathways database 228. The predicted route of each mobile device is stored in the tracking database 154.

Figure 6:
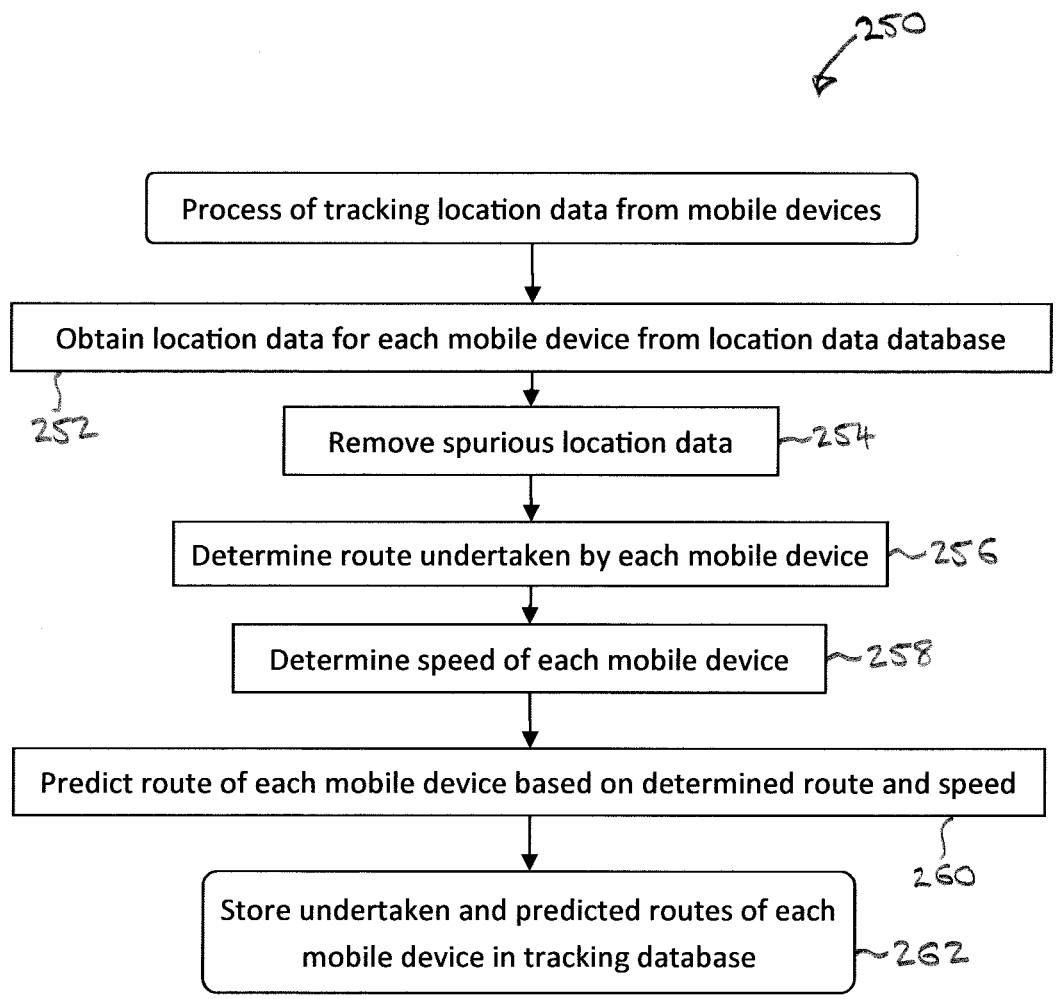
FIG. 6 is a flowchart illustrating a process carried out by the tracking module of FIG. 2.

FIG. 6 shows a process 250 carried out by the tracking module 144 to determine the route that each mobile device 106 has undertaken in the time period and to extrapolate where each mobile device may be at a future time.

The process 250 starts with the time and location analyser 222 obtaining at Step 252 the location data for a predetermined time range from the location data database 152 via the system controller 142 and the tracking module controller 220.

For each mobile device's location data, if the difference between adjacent data points is above a predetermined threshold relative to the other data points, then the time and location analyser 222 defines at Step 254 them to be spurious. Any data points marked as spurious are removed, also at Step 254, and the time and location analyser 222 outputs the clean location data to the route determiner 224.

Next, the route determiner 224 compares at Step 256 the clean location data to known pathways from the pathway database 228 and determines the pathway(s) that each mobile device 106 has moved on, the route that the mobile device has undertaken along these pathways. The route determiner 224 also calculates at Step 258 the speed of the mobile device 106.

The route extrapolator 226 then predicts at Step 260 the likely trajectory of each mobile device 106 over a predetermined length of time into the future. The route extrapolator 226 estimates a high extreme and low extreme position of the mobile device at the end of the predetermined length of time into the future. The high extreme is the furthest away from the last known location that the mobile device is predicted to be with a predetermined level of certainty. The low extreme is the nearest to the last known location that the mobile device is predicted to be with a predetermined level of certainty. The route extrapolator 226 determines at Step 260 the high extreme and low extreme positions by taking into account the route already undertaken and the speed (determined at Steps 256 and 258 respectively), factors affecting the pathway that the mobile device is on, for example junctions if the pathway is a road or stations if the pathway is a rail track, from the pathway database 228. The predicted route may end on a different pathway to the current pathway that the mobile device 106 is currently on.

The route and speed determined at Step 256 and Step 258, and the high extreme and low extreme positions determined at Step 260 are all stored at Step 262 in the tracking database.

Figure 7:
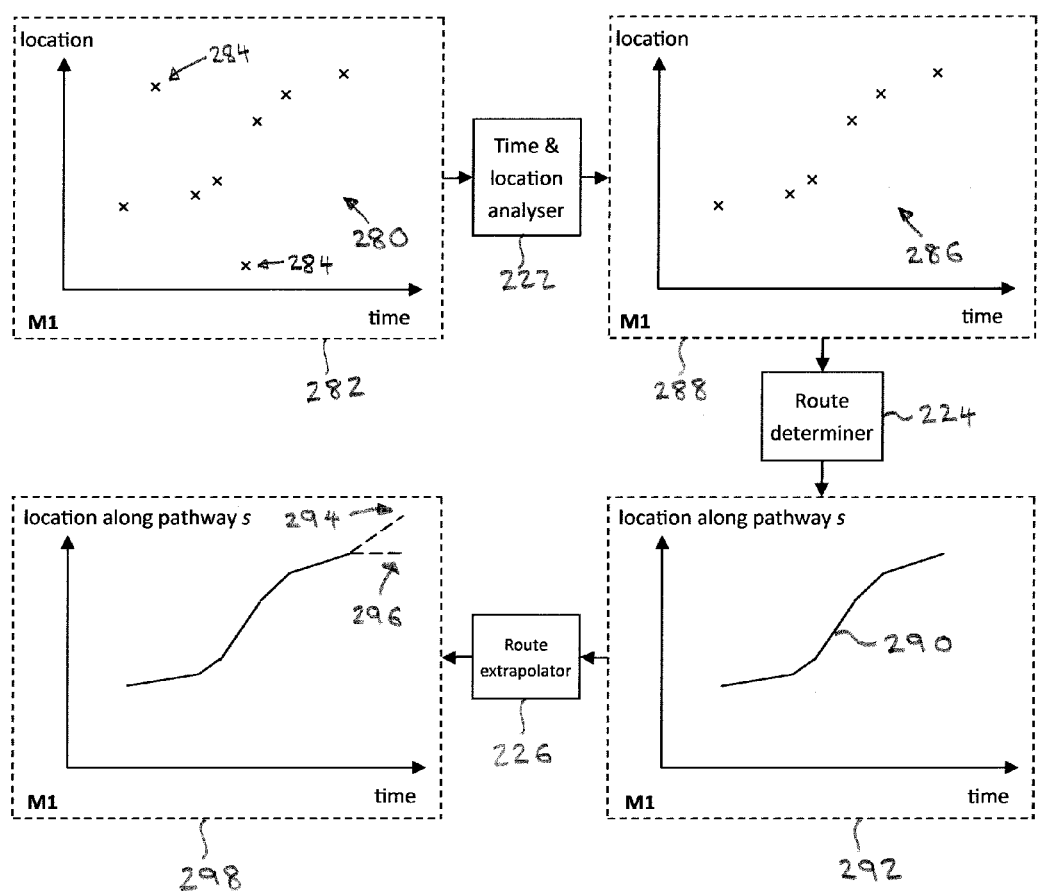
FIG. 7 is a schematic diagram of the process of FIG. 6.

FIG. 7 illustrates the process 250 carried out in FIG. 6 with reference to the example environment of FIG. 1. In the example, mobile device 106 M1 is moving along the pathway s 102. The location of M1 along pathway s is shown plotted against time 280 for a time period in Box 282. This location data 280 is obtained by the tracking module controller 220 and communicated to the time and location analyser 222 which determines using statistical analysis that two of the data points 284 are spurious due to their significant difference (in terms of standard deviation) from adjacent data points and removes them. The two spurious data points 284 are removed from the clean location data 286 shown in Box 288. Standard deviation is a useful parameter to use for such removal, as is correlation of data points.

The clean location data 286 is transmitted to the route determiner 224 which calculates that the location data are consistent with the mobile device travelling along pathway s 102 by mapping the clean location data 286 onto the known pathways in the pathway database 228. The route determiner 224 is configured to generate a line of best fit 290 through the clean location data points 286 that enables the position of the mobile device 106 M1 to be determined at any time during the time period, and this is illustrated in Box 292. In this example, pathway s 102 is a one-dimensional path and the method for determining the line of best fit 290 is linear interpolation. However, other methods for determining line of best fit could readily be used, for example, polynomial interpolation or spline interpolation. The current pathway that the mobile device 106 is on and the line of best fit representing the route undertaken by the mobile device 106 are stored in the tracking database 154.

The route estimator 226 then determines the high extreme 294 and low extreme 296 positions likely positions of the mobile device 106 at the end of a predetermined length of time into the future, as described above. This is shown in Box 298.

Figure 8:
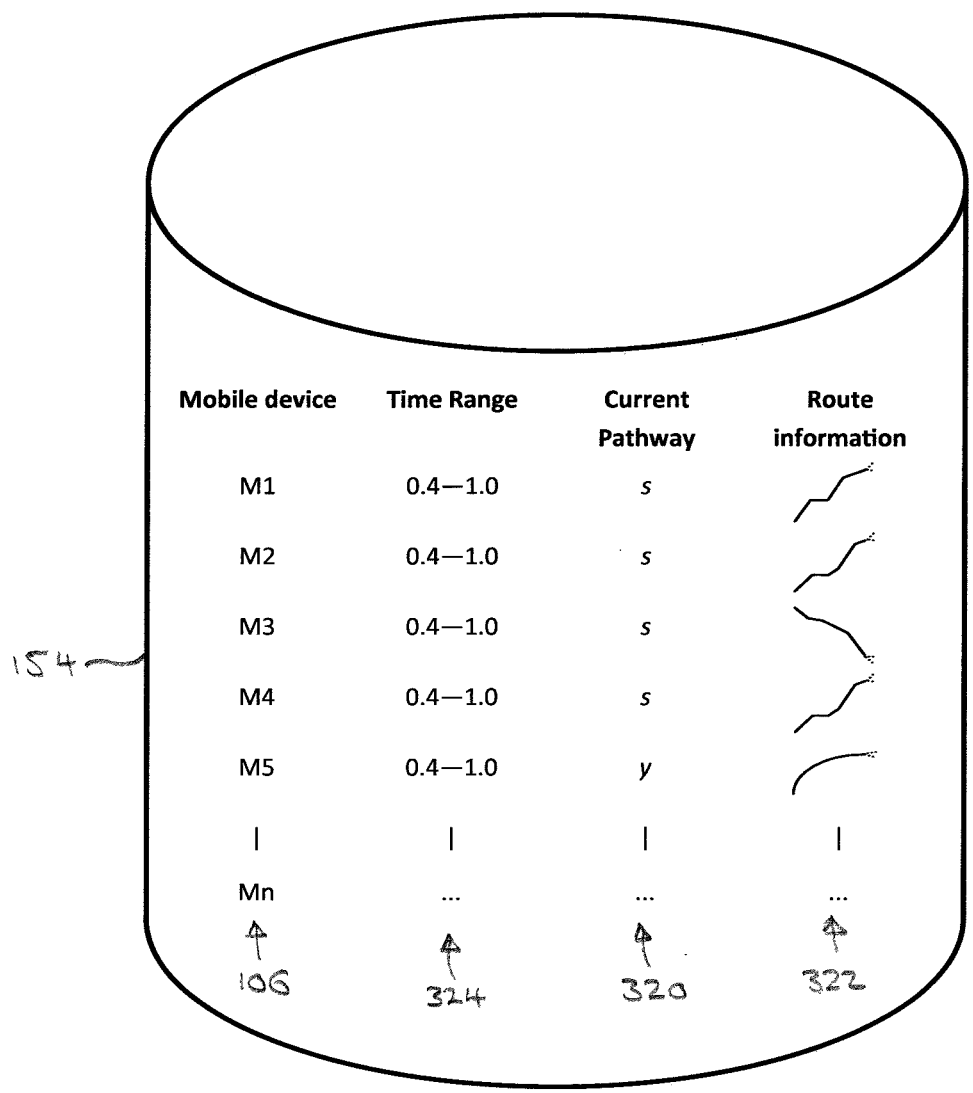
FIG. 8 is a schematic diagram of the tracking database of FIG. 2.

FIG. 8 shows the tracking database 154 in greater detail. For each mobile device 106, the tracking database 154 comprises data regarding the current pathway 320 that the mobile device is on, route information 322 and the time range 324 for which the route information 322 has been determined by the tracking module 144. The route information 322 comprises the route already undertaken, the predicted route that the mobile device 106 will take and the speed at which the mobile device is traveling.

Figure 9:
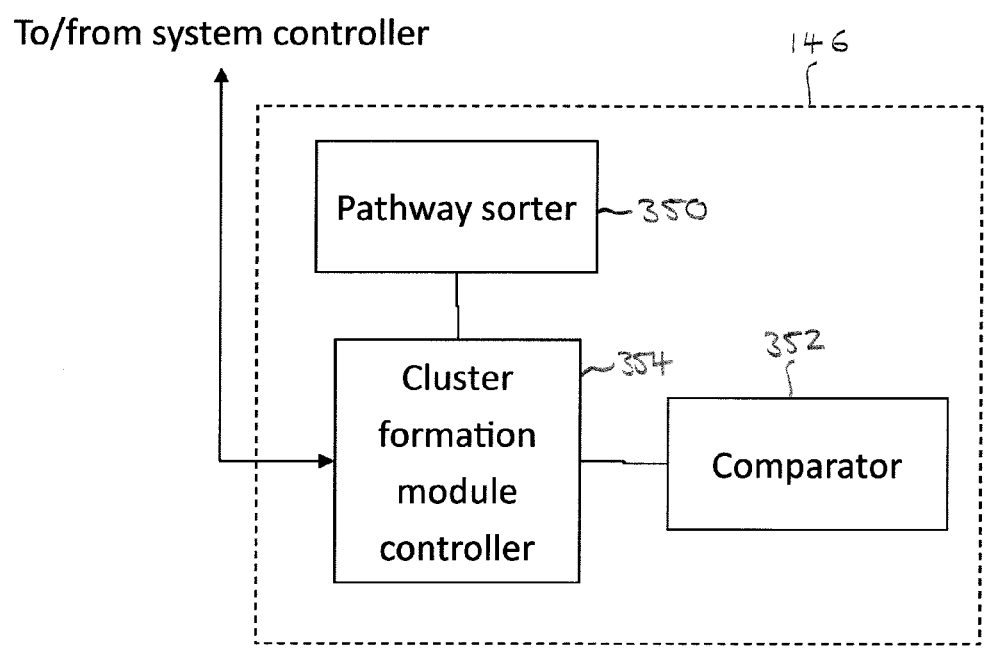
FIG. 9 is a schematic block diagram of the cluster formation module of FIG. 2.

FIG. 9 shows the cluster formation module 146 comprising a pathway sorter 350, a comparator 352, and a cluster formation module controller 354. The pathway sorter 350 and the comparator 352 are each connected to the cluster formation module controller 354. The cluster formation module controller 354 is connected to the system controller 142.

The pathway sorter 350 is configured to obtain data from the tracking database 154 and determine which mobile devices 106 are currently on the same pathway. The pathway sorter 350 instructs the comparator 352 which mobile devices to include in its comparison.

For each pathway, the comparator 352 is configured to retrieve the routes of all the mobile devices on the pathway from the tracking database 154. The comparator 352 analyses these routes to compare them against each other. A group of mobile devices with routes that are within a predetermined limit of each other are defined as the constituents of a cluster 116. Accordingly, the group of mobile devices that form a cluster 116 are a group of mobile devices that are behaving in the same way with respect to mode of travel. The constituents of each cluster 116 are stored in the cluster database 156, along with the time range validity 324 of the route information used to group them.

Figure 10:
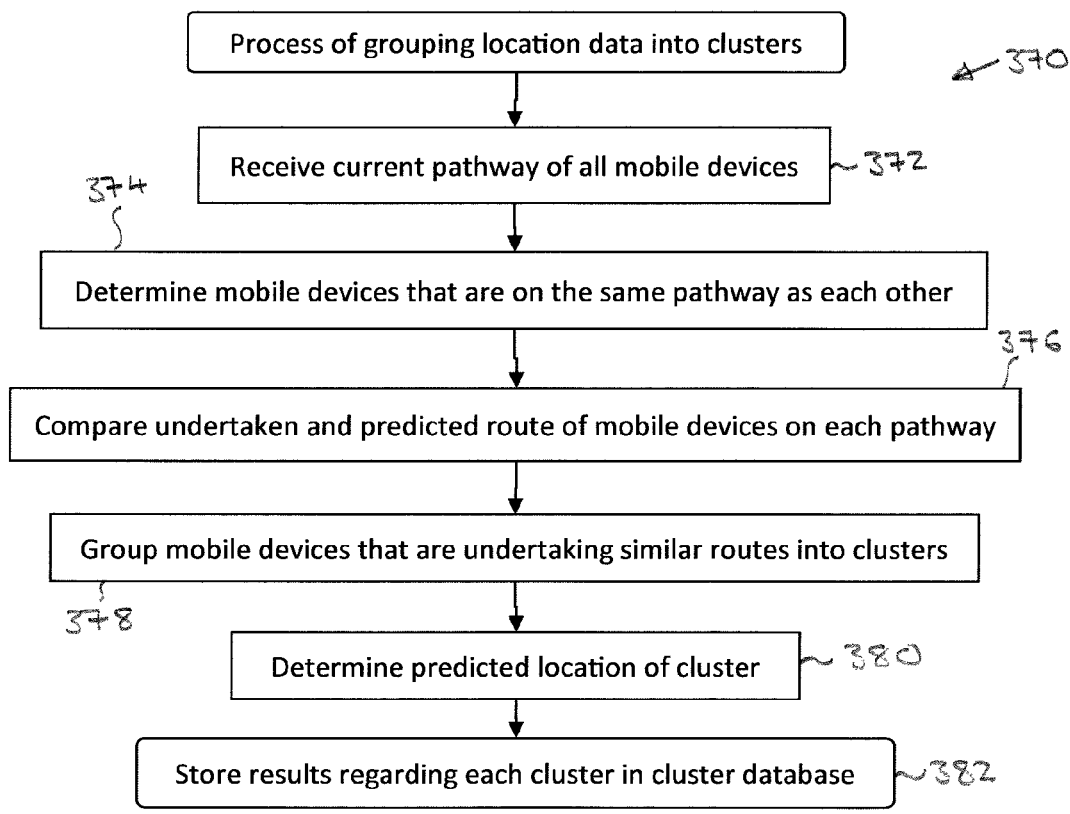
FIG. 10 is a flowchart illustrating a process carried out by the cluster formation module of FIG. 2.

FIG. 10 shows a process 370 carried out by the cluster formation module 146 to determine which mobile devices 106 form clusters 116 for the time period 324 of the route information 322 from the tracking database 154.

The process 370 starts with the pathway sorter 350 receiving at Step 372 the current pathway 320 that each mobile device 106 is on from the tracking database 154. The pathway sorter 350 determines at Step 374 which mobile devices 106 are on the same pathway and communicates the results to the comparator 352. For each pathway, the comparator 352 retrieves the route information 322 of each mobile device on the pathway and compares at Step 376 the route information 322 of all mobile devices on the pathway using statistical analysis.

The mobile devices 106 that are determined to be undertaking similar journeys within the time period are grouped at Step 378 into clusters 116. The predicted location at the end of the time period is determined at Step 380 as an average of the high extreme 294 and low extreme 296 positions of the mobile devices 106 in the cluster 116. Information regarding the constituent mobile devices of each cluster 116 and the predicted location are stored at Step 382 in the cluster database 156.

Figure 11A:
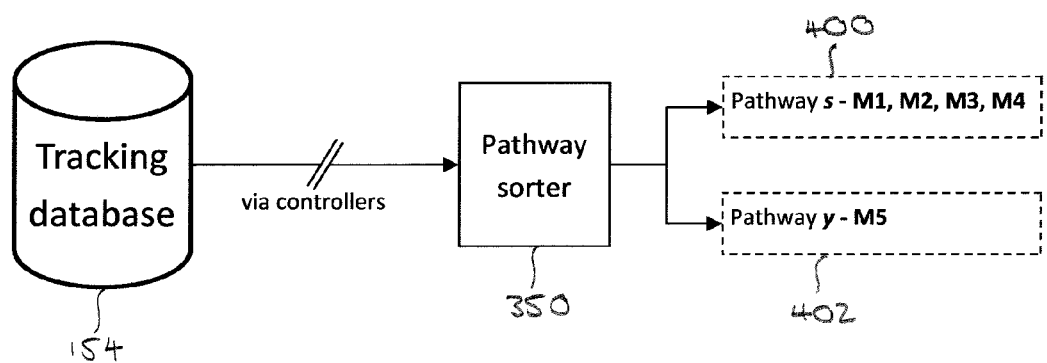
FIGS. 11(a) and 11(b) are schematic diagrams of the process of FIG. 10.
Figure 11B:
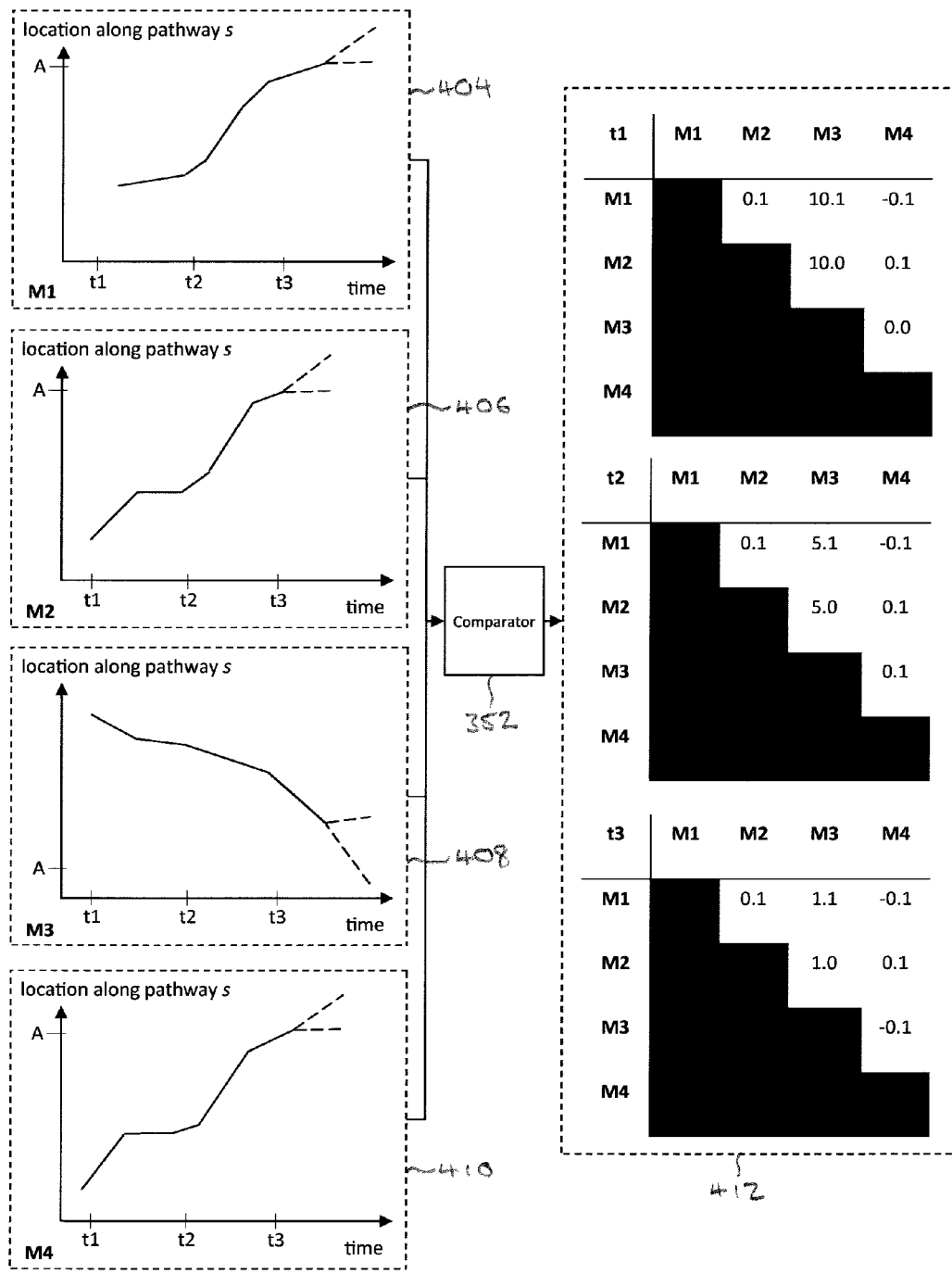

FIGS. 11(*a*) and 11(*b*) illustrate the process 370 carried out in FIG. 10 with reference to the example environment of FIG. 1.

FIG. 11(*a*) shows the pathway sorter 350 obtaining the current pathway information 320 from the tracking database 154 via the system controller 142 and the cluster formation module controller 354. The pathway sorter 350 determines which mobile devices 106 are currently on pathway s 102 and which mobile devices are on pathway y 104 and separates them, as illustrated in Box 400 for pathway s and Box 402 for pathway y.

FIG. 11(*b*) shows the comparator 352 processing the mobile devices on pathway s 102. The comparator obtains the route information 322 from the tracking database 154. At the point in time of FIG. 1, mobile devices 106 M1 to M4 are all on pathway s 102 and close to line A-A. The routes undertaken by these mobile devices are illustrated in Box 404 for M1, Box 406 for M2, Box 408 for M3 and Box 410 for M4.

The routes are analysed by the comparator 352 which determines the difference between each of the routes at predetermined points in time, t1, t2 and t3. The differences determined by the comparator 352 at each of the three predetermined points in time are shown in Box 412.

By finding the relative difference in distances between the mobile devices on the same path in this way, the comparator 352 determines that mobile devices 106 M1, M2 and M4 are relatively close together at each of the three predetermined points in time (t1, t2 and t3). Accordingly it groups mobile devices 106 M1, M2 and M4 into a cluster 116.

Mobile device M3 has a significant difference from the other mobile devices on pathway s 102 at time point t1. The difference reduces by time period t3, however, the comparator 352 determines that mobile device 106 M3 is not travelling with the same behaviour as M1, M2 and M4. Accordingly, the comparator 352 defines M3 to be in a cluster by itself.

Whilst three predetermined time points within the time period are used in this example, more time points could readily be used to increase the number of differences calculated and provide a more rigorous match of mobile devices before grouping them into clusters.

The mobile device 106 M5 is on pathway y 104 and so it is grouped into a cluster by itself from the process described above.

Figure 12:
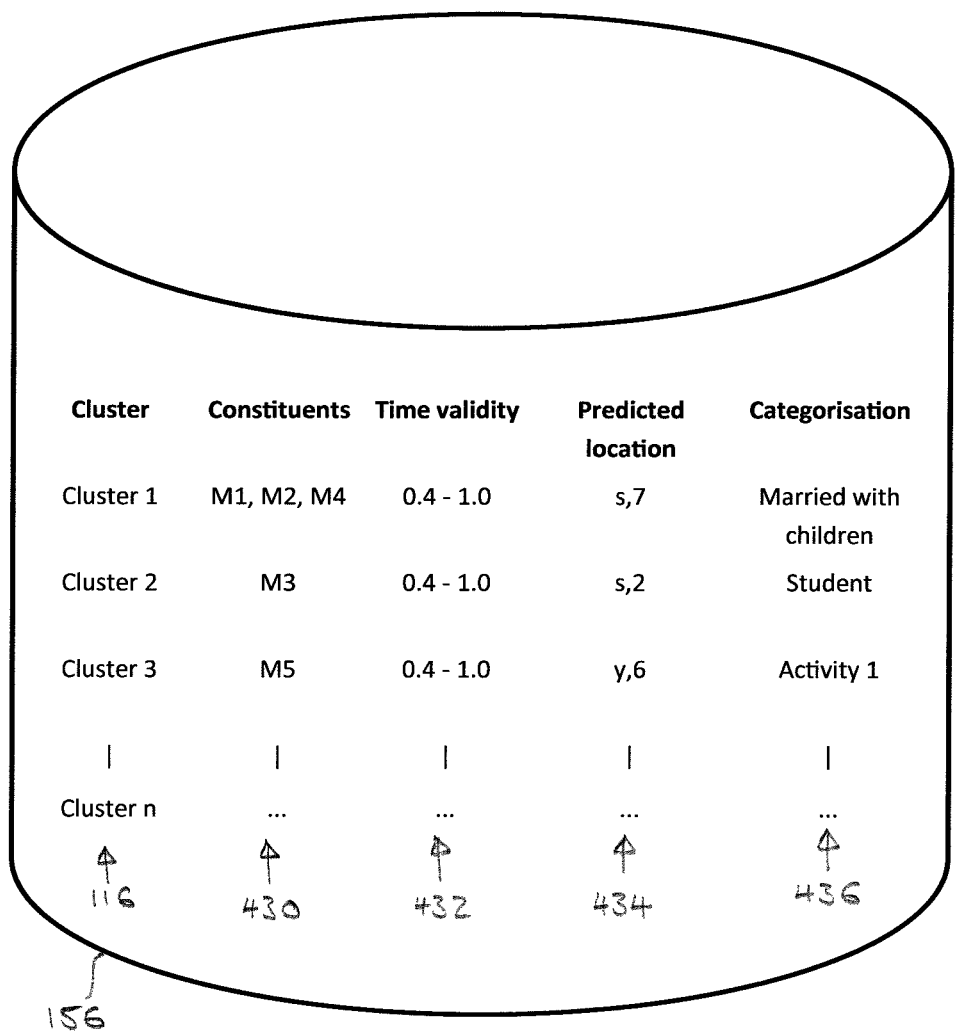
FIG. 12 is a schematic diagram of the cluster database of FIG. 2.

FIG. 12 shows the cluster database 156 in greater detail. For each cluster 116, the cluster database 156 comprises the constituents of the cluster 430, the time validity of the cluster 432, the predicted location 434 at the end of the time period and a cluster categorisation 436. The time validity 432 is defined by the time period 324 of route information 322 available from the tracking database 154. The predicted location 434 is an average of the high extreme 294 and low extreme 296 positions for the mobile devices 106 in the cluster 116.

The cluster categorisation 436 is one or more features that are common between the users associated with the mobile devices 106 that constitute the cluster 116. The process of determining the commonalities of the cluster constituents is carried out by the cluster categorisation module 148.

Figure 13:
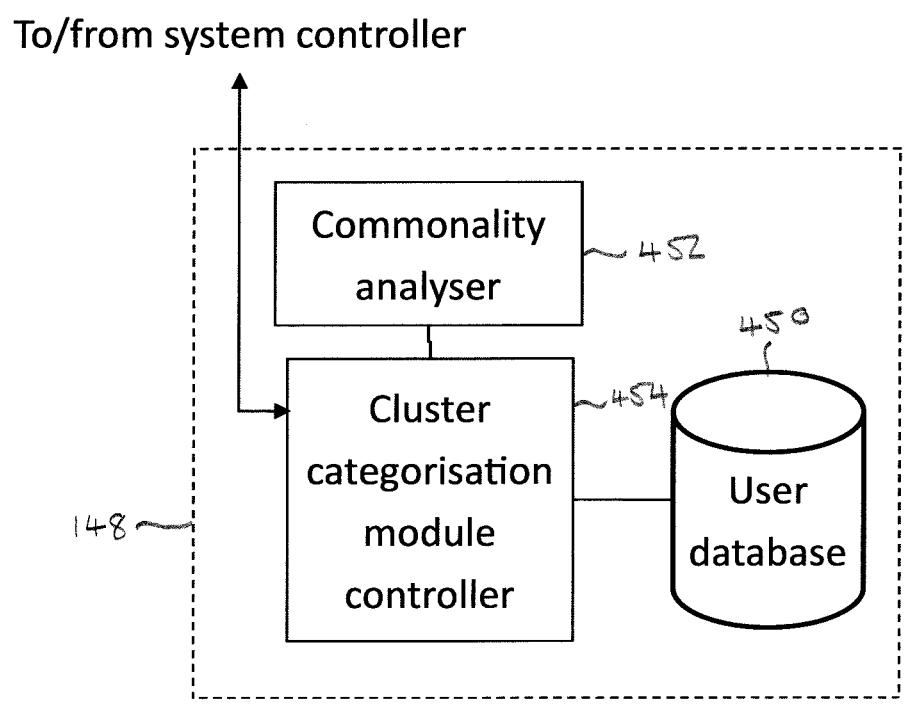
FIG. 13 is a schematic diagram of the cluster categorisation module of FIG. 2.

FIG. 13 shows the cluster categorisation module 148 in greater detail. The cluster categorisation module 148 comprises a user database 450, a commonality analyser 452 and a cluster categorisation module controller 454. The user database 450 and the commonality analyser 452 are connected to the cluster categorisation module controller 454.

The commonality analyser 452 determines any shared interests or features of the cluster constituents by retrieving information associated with the users from the user database 450 of the mobile devices in each cluster 116.

Figure 14:
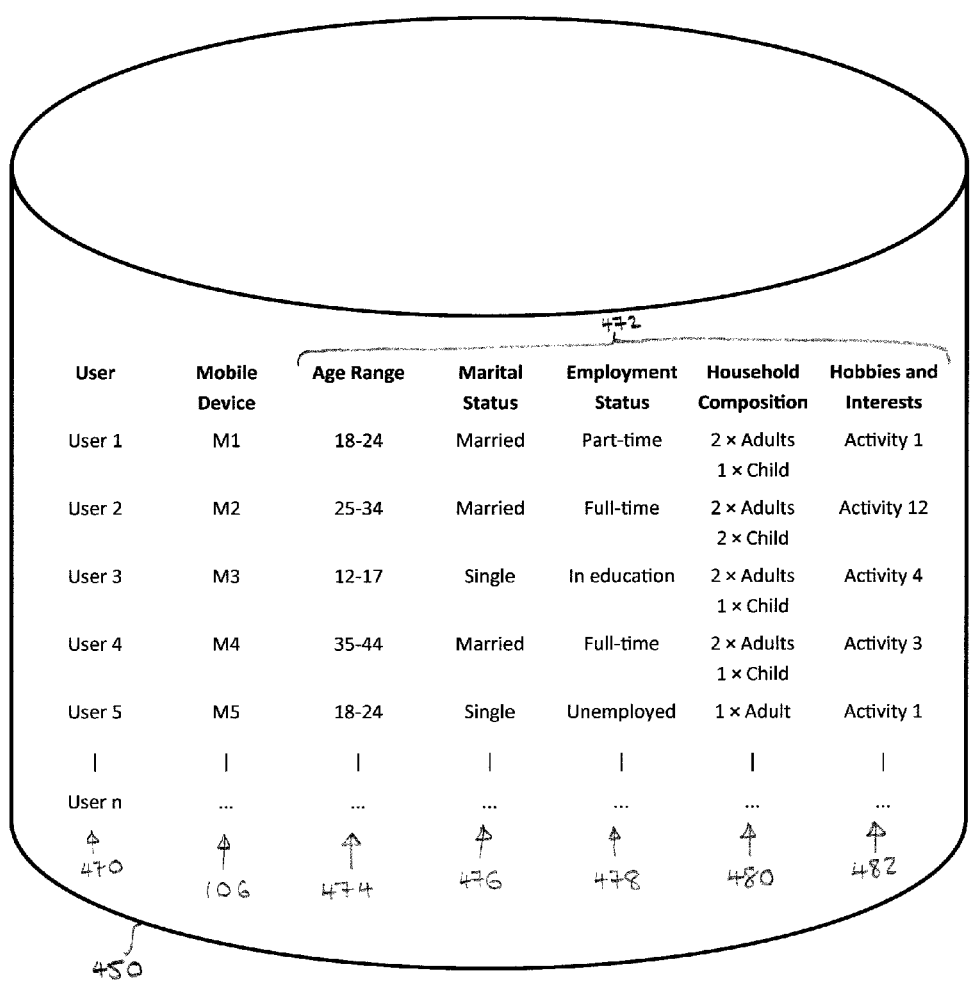
FIG. 14 is a schematic diagram of the user database of FIG. 13.

FIG. 14 shows the user database 450 in greater detail. Each mobile device 106 is associated with a user 470, and the user profile 472, comprising information related to the user, is stored in the user database 450. Each user is associated with one mobile device, but in other embodiments, one user may be associated with a plurality of mobile devices. In this example, the user profile 472 comprises age range 474, marital status 476, employment status 478, household composition 480 and hobbies and interests 482. The user profile 472 may comprise personal or private information related to the user and is obtained from data that the user 470 has provided and data obtained from third parties.

Figure 15:
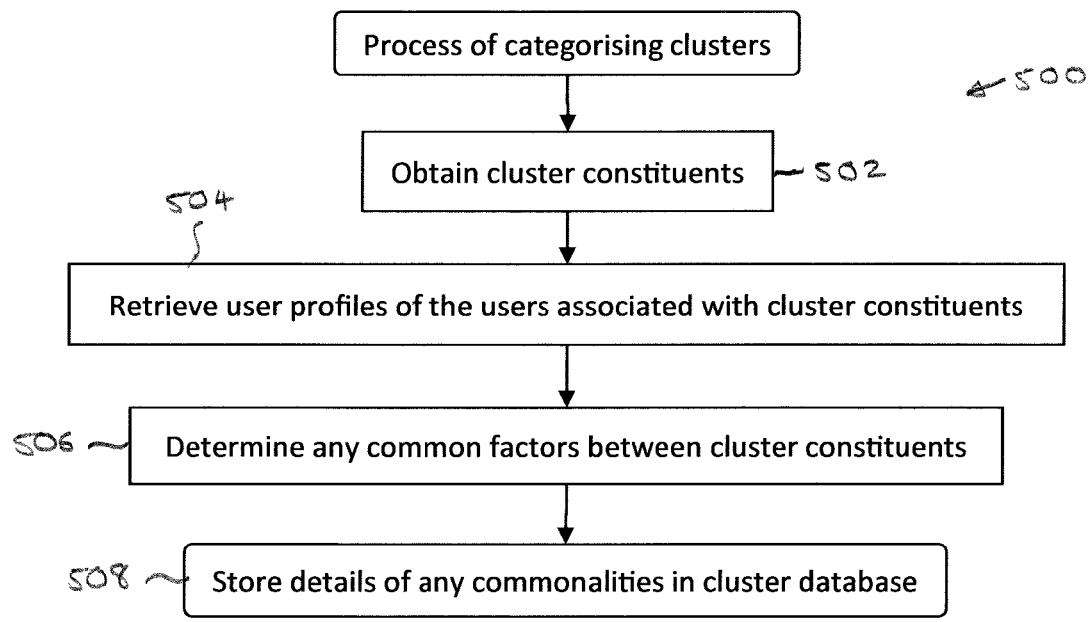
FIG. 15 is a flowchart illustrating a process carried out by the cluster categorisation module of FIG. 2.

FIG. 15 shows a process 500 carried out by the cluster categorisation module 148 to determine any commonalities between cluster constituents. The process 500 starts with the commonality analyser 452 obtaining at Step 502 for each cluster 116 the cluster constituent 430 mobile devices from the cluster database 156.

The commonality analyser 452 retrieves at Step 504 the user profiles 472 of the cluster constituents 430. Then the commonality analyser 452 determines at Step 506 any shared interests or common features between the users by determining the most occurring (i.e. mode) user profile data. The results of the commonality analyser 452 are stored at Step 508 in the cluster database 156.

Figure 16:
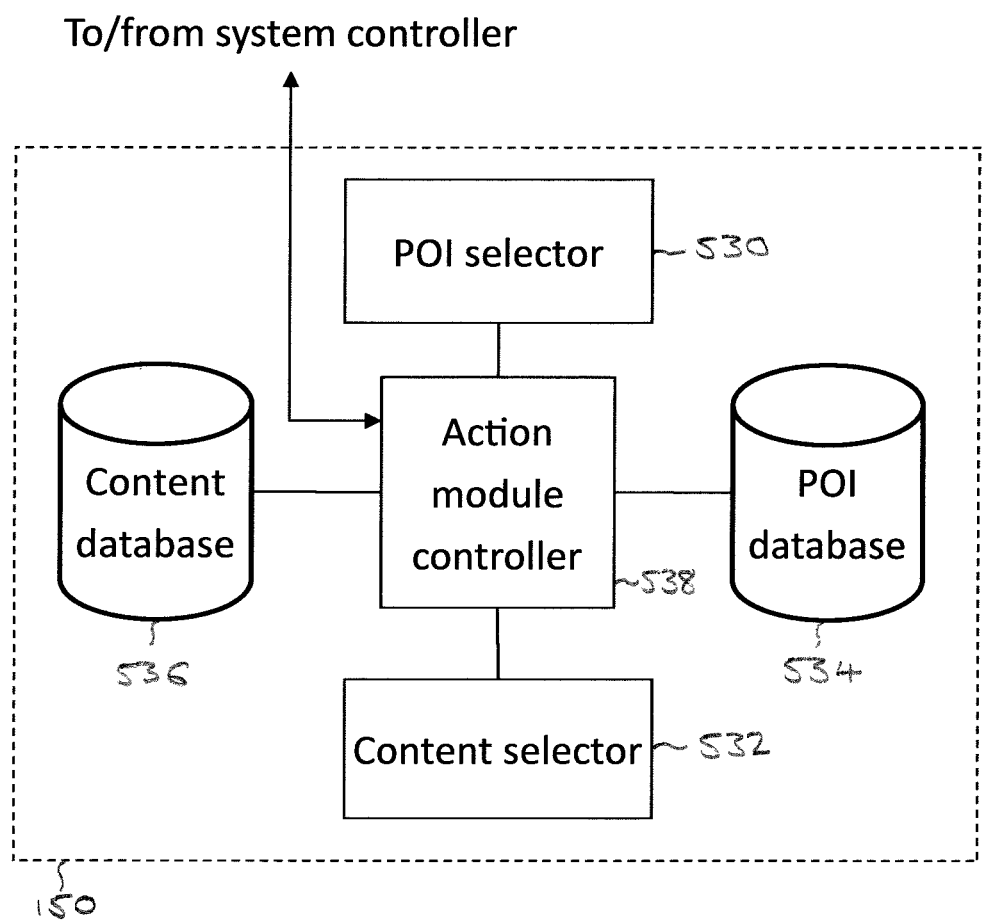
FIG. 16 is a schematic diagram of the action module of FIG. 2.

FIG. 16 shows the action module 150 in greater detail. The action module 150 comprises a POI selector 530, a content selector 532, a POI database 534, a content database 536 and an action module controller 538. The POI selector 530, the content selector 532, the POI database 534 and the content database 536 are each connected to the action module controller 538. The action module controller 538 is connected to the system controller 142.

The POI database 534 comprises the location and the capabilities of each POI 114. The POIs may be scrolling billboards, LED gantries (e.g. over major roads) or video-capable LED displays and accordingly have different capabilities to display content.

The content database 536 comprises details of actions (e.g. messages and advertisements). Each action in the content database 536 comprises predefined tags that indicate which category they are relevant to, the POI capability requirements and a predetermined priority.

The POI selector 530 is arrange to determine, for each cluster 116, the one or more points of interaction 114 that it will perform the action on, based on where the cluster is expected to be and where the POIs are located.

The content selector 532 is configured to select an action that is suitable for the categorisation 436 of each cluster and the capabilities of the one or more points of interaction chosen by the POI selector 530. The action is communicated to the POI 114 for execution.

Figure 17:
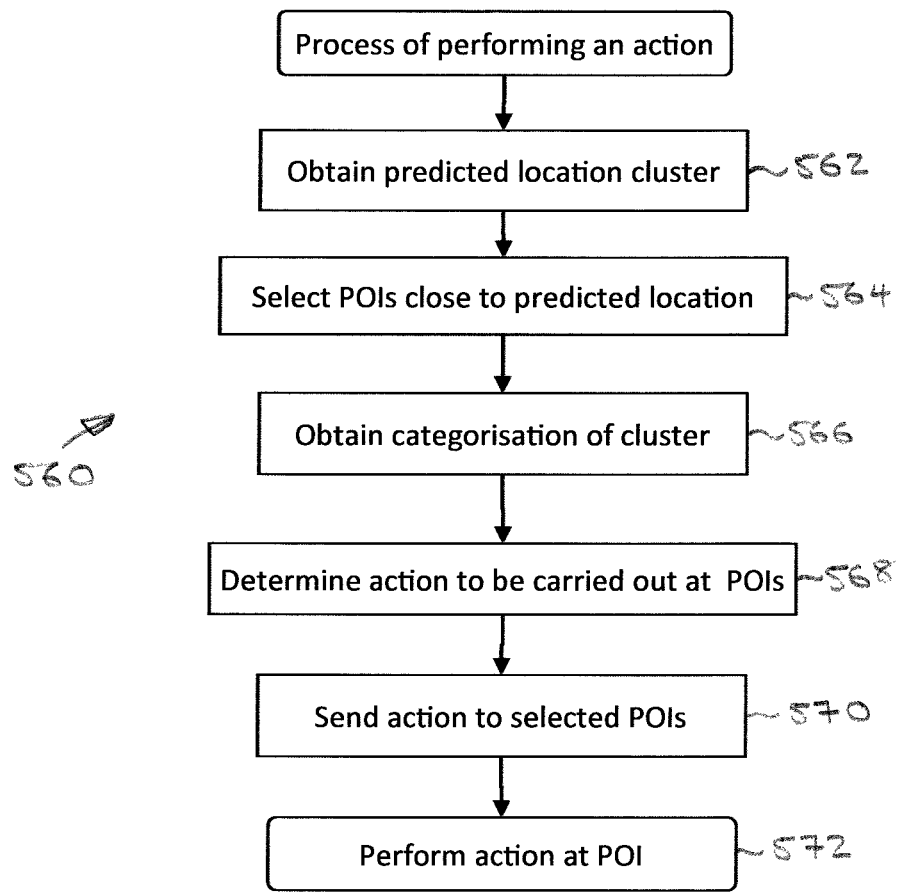
FIG. 17 is a flowchart illustrating a process carried out by the action module of FIG. 2.

FIG. 17 shows a process 560 carried out by the action module 150 to determine which action to carry out on which POI 114. The process 560 starts with the POI selector 530 obtaining at Step 562 the predicted location 434 of each cluster from the cluster database 156.

Following this, the POI selector 530 chooses at Step 564 one or more POIs 114 that are within a predetermined range of the predicted location 434 of each cluster 116, using the known locations of the POIs from the POI database 534. Once the POIs 114 are selected, their capabilities are identified from the POI database 534 and communicated to the content selector 532.

The content selector 532 then obtains at Step 566 the categorisation 436 of each cluster from the cluster database 156. The categorisation 436 is used to determine at Step 568 relevant action based on the tags and capabilities of the one or more POIs previously selected at Step 564.

If at Step 568 a plurality of actions relevant to the categorisation 436 of a cluster is identified by the content selector 532, the predetermined priority is used to determine which action is selected. For example, an action with a higher priority will be selected over an action with a lower priority.

The chosen action is sent at Step 570 to the one or more selected POIs, and the action is executed at Step 572.

Many modifications may be made to the above examples without departing from the scope of the present invention as defined in the accompanying claims.

For example, there may be multiple predicted locations 434 of a cluster on different pathways. In this case, the action module 150 may send the action to a plurality of POIs 114 on the different pathways in readiness, as the action may require time to be communicated to the POIs 114. Once the predicted location 434 is refined through the iterative process 180 shown in FIG. 3, the action module 150 would send the instruction to execute to only the relevant POI 114.

If the comparator 352 of the cluster formation module 354 determines that a plurality of mobile devices 106 are travelling together within a predetermined difference limit over the time period, the comparator 352 determines that the users associated with the mobile devices are travelling together in the same container, for example on a bus or train. The speed and route information 322 of the mobile devices from the tracking database 154 can be used to corroborate the determination that the mobile devices 106 are being transported together. For example, in a case whether a cluster of mobile devices is determined to be on a train, the POI may be an LCD display within the train carriages or an LED billboard on the platform of the next station.

A portion of the mobile devices may be associated with vehicles travelling along roads. The tracking module 144 determines the speed and route of the mobile devices, and distinguishes the portion of mobile devices associated with vehicles, for example from mobile devices associated with pedestrians. The tracking module makes this distinction by the higher average speed and the type of route undertaken (e.g. only following pathways suitable for vehicles) by the mobile devices associated with vehicles. In this case, the content selector 532 of the action module 150 could determine the current and future traffic conditions (comprising the density of traffic and speed of traffic flow) on the roads by the number of clusters, the number of cluster constituents and the predicted location 434 of each cluster. The pathway database 228 may further comprise the vehicular capacity of the pathways in order to aid in the determination of traffic conditions. Further, the POIs 114 chosen by the POI selector could be LED gantries over the roads or the mobile devices themselves, informing drivers of traffic conditions ahead.

In an extension of the above example, a point of interaction 114 may be a user's mobile device and actions comprise the user's calendar appointments. The content selector 532 of the action module 150 could determine the time that the user needs to depart their current location and an optimum route in order to arrive on time at their appointment destination. This would take into account the current and future traffic conditions determined as described above.

The mobile devices 106 may determine their location using Wi-Fi. This is of particular use when inside buildings for example in train stations or shopping centres. This could enable the tracking of users within buildings and may allow POIs 114 within train stations or shopping centres to deliver relevant content to passing users.

In other embodiments, the cluster database 156 further comprises the likely mode of transport that the cluster constituents 430 are using, determined from the speed and type of route that the mobile devices are undertaking. Additionally, the user profile 472 in the user database 450 may further comprise details on whether the user has been previously been a constituent of any clusters. Accordingly, the information control system 100 may be further configured to determine each user's usage of transportation modes across a geographic region. For example, the information control system 100 may determine the clusters that a user was a constituent of during a day from the user database 450 and retrieve the mode of transport used by each of these clusters from the cluster database 156 to determine how the user travelled during the day.

The invention claimed is:

1. A control system for tracking moving objects and controlling an action at a selected one of a plurality of geographic locations, the system comprising:
   a receiver for receiving location data from a plurality of mobile devices;
   a tracking module for recording the location data from each of the plurality of location devices in a tracking database;
   a cluster formation module for grouping a plurality moving mobile devices into a cluster using the recorded location data over time, each cluster comprising a plurality of moving mobile devices which have substantially no relative movement with respect to each other;
   a route extrapolator for determining a geographic location at which the cluster of mobile devices will be at a future point in time using the tracked history of the cluster and a predetermined network of pathways along which the cluster can travel; and
   an action module for sending out an instruction regarding an action to be carried out at the selected geographic location where the cluster is predicted to arrive at the future point in time.

2. The system of claim 1, wherein the cluster formation module is arranged to apply predetermined thresholds to minimal allowable relative movement between different mobile devices within the definition a cluster.

3. The system of claim 1, wherein the route extrapolator is arranged to determine two or more geographic locations at which the cluster may be at a future point in time, the two or more geographic locations comprising a subset of the plurality of geographic locations.

4. The system of claim 1, further comprising a cluster categorisation module for categorising a cluster according to a most-common feature of each of the constituents of the cluster.

5. The system of claim 4, wherein the cluster categorisation module is arranged to retrieve stored user profiles of each of the constituents of a cluster from a user profile database, each profile providing information regarding a user in a plurality of categories.

6. The system of claim 4, further comprising a cluster database for storing the details of each cluster including the most common feature determined by the cluster categorisation module.

7. The system of claim 4, wherein the action module is arranged to select the action based on a most common feature of the cluster.

8. The system of claim 1, further comprising a points-of-interaction database having a plurality of records, each record including a geographic location of a corresponding information interaction point at which audio-visual information can be provided to the cluster.

9. The system of claim 8, wherein each record comprises a communications address of a remotely controllable interactive advertising display, to which the instruction can be sent.

10. The system of claim 8, further comprising a selector for selecting a point of interaction from the points-of-interaction database, the selected point of interaction being located at the determined geographic location.

11. The system of claim 8, further comprising a cluster categorisation module for categorising a cluster according to a most-common feature of each of the constituents of the cluster, and a content database for storing content to be sent to the point of interaction and a content selector for selection the content based on the most common feature of the cluster.

12. The system of claim 1, further comprising a pathway database storing a predetermined network of pathways along which the cluster can travel.

13. The system of claim 12, wherein the pathway database includes timetabled transport network information, road network information and pedestrian walkway information.

14. The system of claim 12, further comprising a pathway sorter, for determining a predetermined pathway of the pathways database which a current mobile device is traversing, the pathway sorter being arranged to read the tracking database.

15. The system of claim 1, further comprising a time and location analyser remove erroneous or spurious data from each mobile device's location data.

16. The system of claim 15, wherein the time and location analyser is arranged to apply statistical analysis to remove the erroneous data over a period of time.

17. The system of claim 15, further comprising a route determiner configured to determine the route that the mobile device has undertaken along a pathway and the speed of movement along the route.

18. A method of tracking moving objects and controlling an action at a selected one of a plurality of geographic locations, the method comprising:
   receiving location data from a plurality of mobile devices;
   recording the location data from each of the plurality of location devices;
   grouping a plurality of moving mobile devices into a cluster using the recorded location data over time, each cluster comprising a plurality of moving mobile devices which have substantially no relative movement with respect to each other;
   determining a geographic location at which the cluster of mobile devices will be at a future point in time using the tracked history of the cluster and a predetermined network of pathways along which the cluster can travel; and
   sending out an instruction regarding an action to be carried out at the selected geographic location where the cluster is predicted to arrive at the future point in time.

19. A control system for tracking moving objects and controlling an action at a selected one of a plurality of geographic locations, the system comprising:
- a receiver for receiving location data from a plurality of mobile devices;
- a tracking module for recording the location data from each of the plurality of location devices in a tracking database;
- a cluster formation module for grouping a plurality moving mobile devices into a cluster using the recorded location data over time, each cluster comprising a plurality of moving mobile devices which have substantially no relative movement with respect to each other;
- a route extrapolator for determining a geographic location at which the cluster of mobile devices will be at a future point in time using the tracked history of the cluster and a predetermined network of pathways along which the cluster can travel; and
- an action module for sending out information regarding where the cluster is predicted to arrive at the future point in time.

20. The system of claim 19, further comprising an analysis module for determining the size and speed of each cluster.

21. The system of claim 19, wherein the analysis module is arranged to compare the output of the cluster formation module with a plurality of predetermined profiles to determine a mode of transport which the cluster is associated with.

22. The system of claim 21, wherein the analysis module is arranged to use the determined mode of transport in calculating traffic build up on parts of the network of pathways.

23. The system of claim 19, wherein the action module is arranged to send the information out to the mobile device to which the information relates.

24. A method of tracking moving objects and controlling an action at a selected one of a plurality of geographic locations, the method comprising:
- receiving location data from a plurality of mobile devices;
- recording the location data from each of the plurality of location devices;
- grouping a plurality of moving mobile devices into a cluster using the recorded location data over time, each cluster comprising a plurality of moving mobile devices which have substantially no relative movement with respect to each other;
- determining a geographic location at which the cluster of mobile devices will be at a future point in time using the tracked history of the cluster and a predetermined network of pathways along which the cluster can travel; and
- sending out information regarding where the cluster is predicted to arrive at the future point in time.

* * * * *